United States Patent Office 2,736,463
Patented Feb. 28, 1956

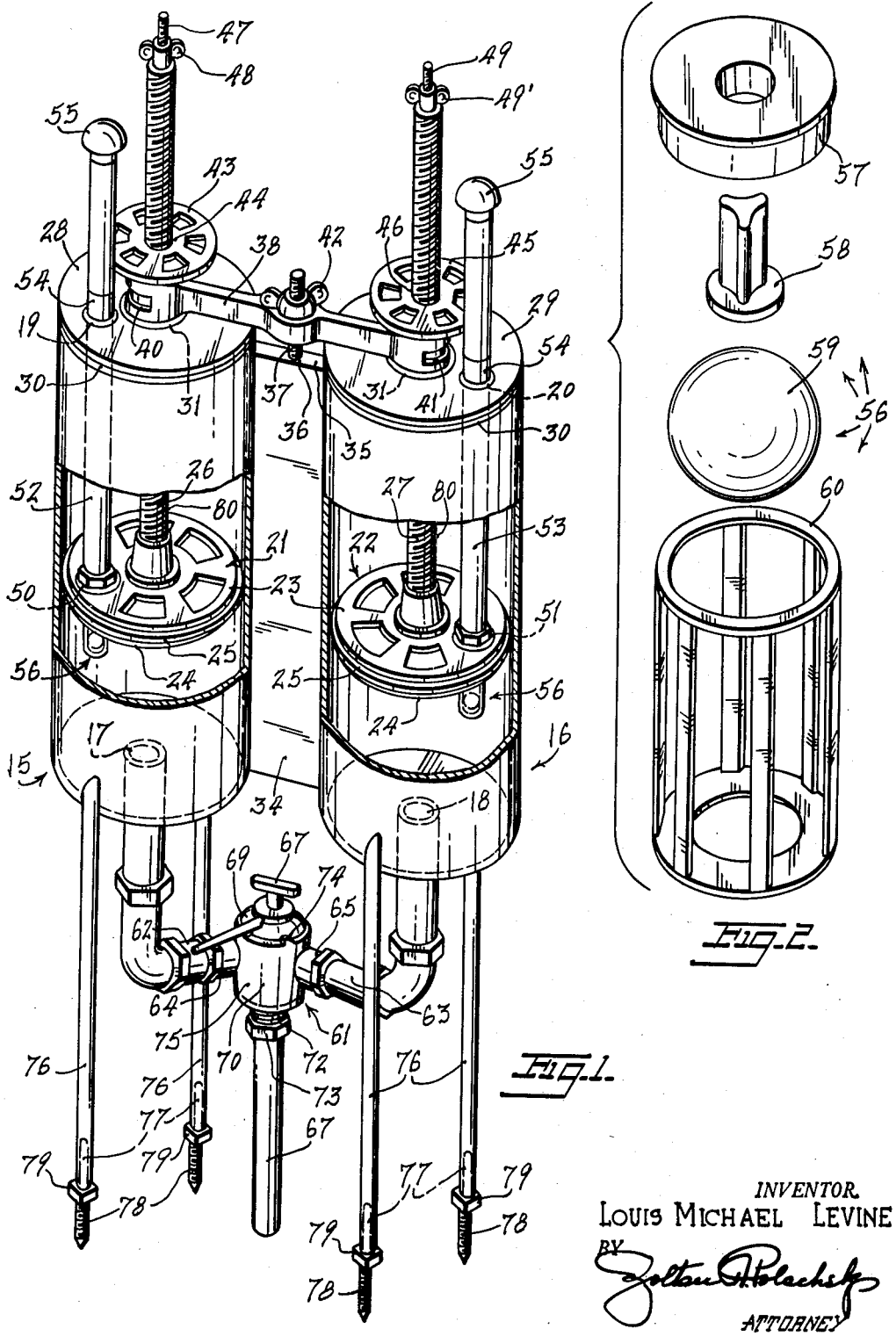

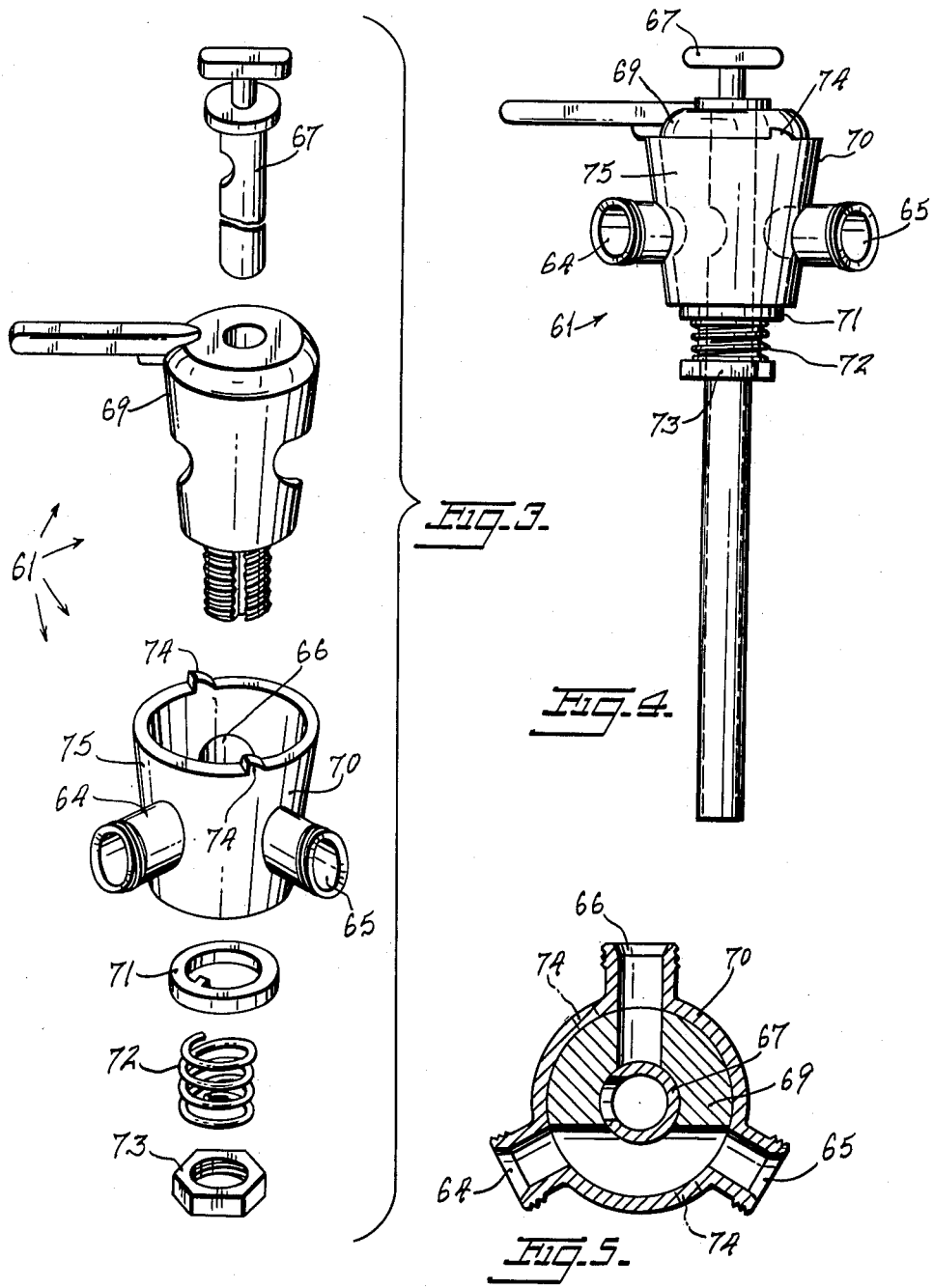

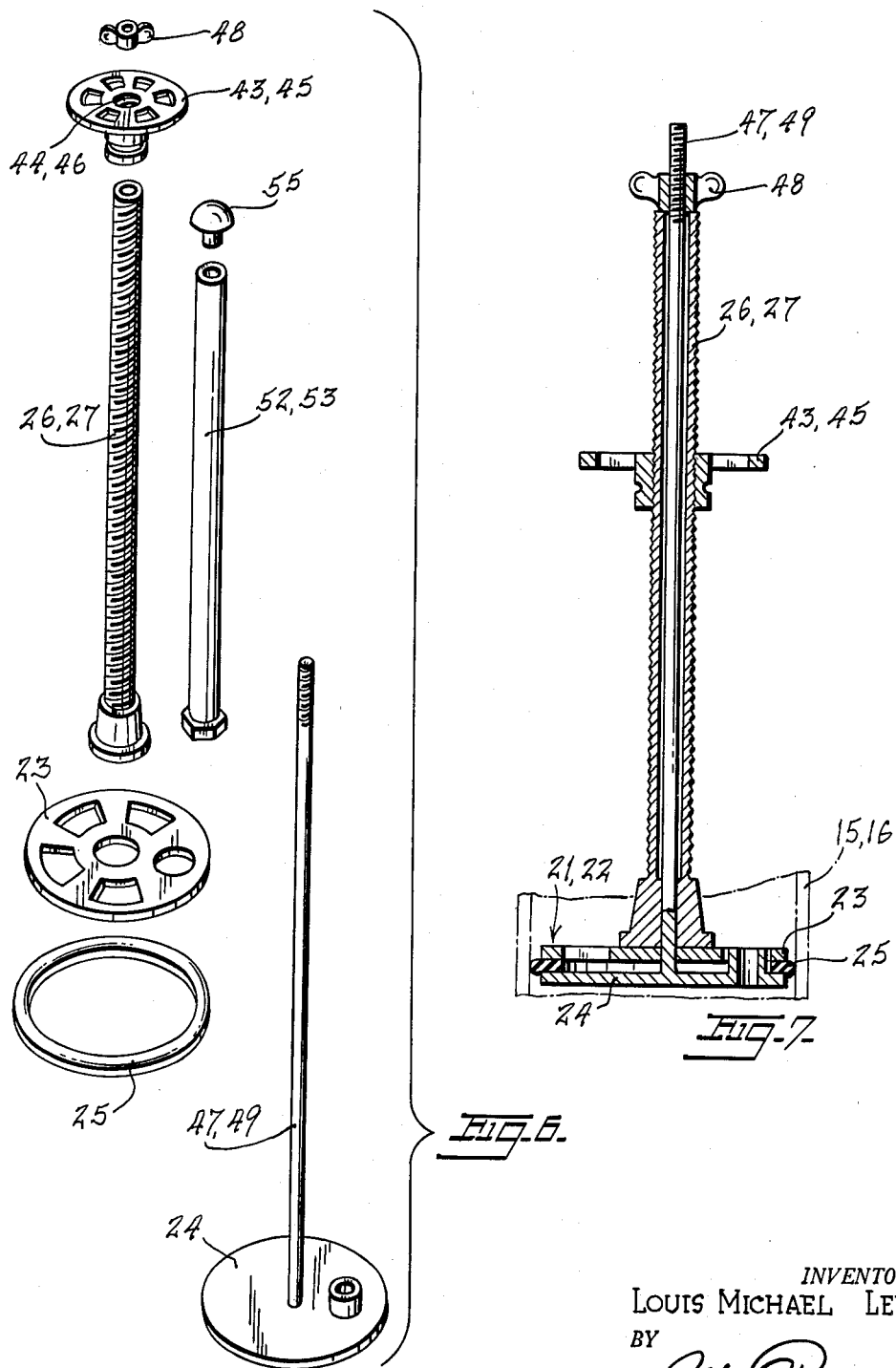

2,736,463

ADJUSTABLE MEASURING AND DELIVERY DEVICE FOR MILK OR OTHER LIQUID

Louis Michael Levine, Brooklyn, N. Y., assignor to Mejur Corporation, New York, N. Y., a corporation of New York Application September 16, 1952, Serial No. 309,774

8 Claims. (Cl. 222—26)

This invention relates to improvements in machines capable of delivering measured quantities of fluids, such as milk, to a container, such as a forty quart milk can.

One object of the invention is to provide a machine for filling containers which can readily and conveniently be adjusted by the operator at will to measure and supply any quantity of fluid to a container.

Another object of the invention is to provide a machine adapted to be set to measure two different quantities of the same fluid and to fill containers with these quantities alternately.

A further object of the invention is to provide a container filling machine which can be adjusted to deliver an accurate amount of fluid to a container regardless of the heat, temperature or pressure of the fluid or other factors which may affect the volume delivered.

For further comprehension of the invention and of the objects and advantages thereof, reference will be had to the following description and accompanying drawings, and to the appended claims in which the various novel features of the invention are more particularly set forth.

On the accompanying drawings forming a material part of this disclosure:

Fig. 1 is a perspective view illustrating the improved container filling device of the present invention.

Fig. 2 is an exploded view of the check and air relief valve shown in Fig. 1.

Fig. 3 is an exploded view of the three-way valve shown in Fig. 1.

Fig. 4 is an assembled view of the parts shown in Fig. 3.

Fig. 5 is a section taken in a horizontal plane of the three-way valve.

Fig. 6 is an exploded view of the volume adjusting means and the vent means shown in Fig. 1.

Fig. 7 is an assembled view of the parts shown in Fig. 6.

The improved container filling machine of the present invention has two closed measuring tanks 15 and 16 each having in one end portion a common inlet and outlet opening 17 and 18, respectively, with a vent opening 19 and 20, respectively, in the other end of the tanks. The tanks 15 and 16 are preferably of stainless steel.

A fluidtight fitting piston 21 slidably is contained in tank 15 and a like piston 22 is provided in tank 16. The pistons 21 and 22 contain two plates 23 and 24 with a seal or sealing ring 25 between them. An externally threaded hollow tubular piston rod 26 has one end abutting the upper plate 23 of piston 21 and a like piston rod 27 similarly abuts piston 22.

Tanks 15 and 16 preferably are formed with open upper ends which are closed by removable lids or covers 28 and 29, respectively. Lids or covers 28 and 29 are removably secured to the tanks 15 and 16 by a sealing ring 30.

Each lid or cover is provided with a central opening 31 to permit passage of piston rods 26 or 27. In addition, lid 28 on tank 15 is provided with the vent opening 19 and lid 29 of tank 16 with a similar vent opening 20. The two tanks are held rigidly together by a cross brace 34.

In the upper face 35 of cross brace 34 between the two tanks, a threaded opening 36 is formed to receive one end of a threaded stud 37 and hold the stud in a vertical upstanding position extending above the covers or lids 28 and 29. A hold-down cross bar 38 having a central opening 39 slidably fits on the stud 37.

The hold-down bar 38 has an opening 40 at one end to slidably fit over the piston rod 26 and an opening 41 at its other end similarly to receive the piston rod 27. A wing nut 42 fitting on the threaded stud 37 holds the cross bar 38 in place.

In this manner, a fixed bearing support is provided by the cross bar above the lids and around the piston rods. A piston positioning wheel 43 having a threaded central opening 44 engages the threaded piston rod 26 and a like wheel 45 with a similar opening 46 engages the threaded piston rod 27 providing means to move the piston rods vertically relative to the tanks.

A smaller diameter rod 47 is secured at one end to the lower plate 24 of piston 21 extending through the hollow tubular piston rod 26 and out its upper end. The upper end of rod 47 is threaded and a tightening wing nut 48 fits on the threaded portion of rod 47. When the wing nut 48 is screwed down against the top of piston rod 26, the rod 47 is drawn upwardly until the two piston plates are forced toward each other pressing sealing ring 25 outwardly to make a tight seal against the sides of the tank 15.

A similar rod 49 is provided for the lower plate of piston 22, being formed integral with the plate or welded or threaded to it. A like tightening wing nut 49' is secured to the upper threaded end of rod 49 in the manner described above. When plates 23 and 24 are drawn up, they press out O ring 25 to form a fluidtight seal against the walls of the tank 16.

In this manner, the piston rods provide means to move the pistons to different positions within the tank and by pressing against the upper plates 23 as the wing nuts are drawn down against them, they cooperate with the lower plates 24 to force the sealing rings 25 to form a liquidtight seal to provide fluid measuring chambers beneath the pistons which can be varied in volume.

Pistons 21 and 22 are provided with vent openings 50 and 51 respectively extending through them and these vent openings are connected with vent openings 19 and 20, respectively, in the covers or lids 28 and 29 of the tanks by vent pipes 52 and 53.

The vent pipes 52 and 53 are each attached by a sanitary union at one end to the pistons and extend slidably through the vent openings in the lids or covers of the tanks. A boot 54 is provided around the vent openings 32 and 33 in the lids. Each vent pipe is provided with a breather cap 55 at its upper free end.

Also connected to each vent opening 50 and 51 in the pistons 21 and 22 is a check and air relief valve 56 disposed below the pistons and the vent pipes.

The valves 56 each contain a seat and guide member 57, a fluted check and air relief valve member 58, a float ball 59 to act as a lift for member 58 and a guide cage 60.

An operating valve 61 is connected with the inlet and outlet openings 17 and 18 of tanks 15 and 16 by pipes 62 and 63. The operating valve has tank connecting ports 64 and 65 connected to the pipes 62 and 63, respectively, and a fluid receiving port 66 and a container filling tube 67. The container filling tube 67 extends through and is dependent from the valve.

The operating valve 61 has a plug 69 to control the flow of fluid through the valve from a source of supply and to permit the operator selectively to connect either tank with the fluid receiving port 66 while the other tank is connected with the filling outlet tube 67 and to shut off all flow through the valve when desired. Operative valve 61 has a body 70 (Fig. 3), a keyed washer 71, a spring 72, and a nut 73, stops 74 are provided to stop the plug 69 in the proper positions. A plastic transparent condensate and protective shield 75 is removably secured around the lower part of the operating valve.

Legs 76 extend from each tank and the lower ends of these legs have threaded openings 77 to receive threaded extension members 78 to provide means to adjust individually the length of each leg. Locking nuts 79 are provided on the extension members 78.

The tubular piston rods 26 and 27 preferably have calibrations 80 on them for moving the pistons to locations within the tanks to provide any desired number of measuring chambers of predetermined, known accurate volumes.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a machine capable of filling containers with a measured quantity of fluid, two closed measuring tanks each having an inlet and outlet opening in its lower end and a top opening in the upper end, a fluid tight fitting piston slidable in each tank, each of said pistons having two plates with a resilient seal therebetween, two externally threaded tubular piston rods, each having one end abutting an upper plate, two smaller diameter rods each having one end secured to a lower plate and an upper end extending through a tubular piston rod, means removably secured to the upper end of each of the smaller rods to bear against tubular piston rods and force the plates together to extend the resilient seal therebetween and secure a liquidtight seal in the tanks, two positioning wheels each having a threaded opening engageable with the tubular piston rod for piston location within the tanks, and a fixed bearing support for each wheel rotatably to hold the wheels above the tanks.

2. In a machine capable of filling containers with a measured quantity of fluid, two closed measuring tanks each having an inlet and outlet opening in its lower end and a top opening in the upper end, a fluidtight fitting piston slidable in each tank, each of said pistons having two plates with a resilient seal therebetween, an externally threaded tubular piston rod bearing on each upper plate, the upper end of each tank having an opening to receive and pass the piston rods, a smaller diameter rod having one end secured to the lower plate and an upper end extending through the tubular piston rod, means removably secured to the upper end of each of the smaller rods to bear against the tubular piston rods and draw the smaller rods up in the piston rods to force the plates to press the resilient rings against the tanks, two positioning wheels each having a threaded opening engageable with the tubular piston rod for piston location within the tanks, and a fixed bearing support beneath each wheel rotatably holding the wheels over the tanks, said tubular piston rod having calibrations thereon for moving the piston to locations of predetermined tank volumes.

3. In a machine capable of filling containers with a measured quantity of fluid, two closed measuring tanks each having an inlet and outlet opening in its lower end and a top opening in the upper end, a fluidtight fitting piston slidable in each tank, said piston having two plates with a resilient seal therebetween, an externally threaded tubular piston rod bearing at one end against the upper plate, the upper end of the tank having an opening to receive and pass the piston rod, a smaller diameter rod having one end secured to the lower plate and an upper end extending through the tubular piston rod, means removably secured to the upper end of the smaller rod and adapted to bear against the tubular piston rod, to force the upper and lower plates against the resilient ring to force it outwardly against the sides of the tanks, two positioning wheels each having a threaded opening engageable with the tubular piston rod for piston location within the tanks, and a fixed bearing support beneath each wheel rotatably holding the wheels above the tanks, said tubular piston rod having calibrations thereon for moving the piston to locations of predetermined tank volumes, each piston having a vent opening extending through its plates and past the seal, a vent pipe for each tank having its lower end affixed to the lower plate of each piston and connected with the piston vent opening, and its upper end slidably extending through one of the top openings in the tanks, and a breather cap on the upper end of each vent pipe.

4. In a machine capable of filling containers with a measured quantity of fluid, two closed measuring tanks each having an inlet and outlet opening in its lower end and a top opening in the upper end, a fluidtight fitting piston slidable in each tank, said piston having two plates with a sealing ring therebetween, an externally threaded tubular piston rod having its lower end abutting the upper plate, the upper end of the tank having an opening to receive and pass the piston rod, a smaller diameter rod having one end secured to the lower plate and an upper end extending through the tubular piston rod, a nut on the upper end of the smaller rod bearing against the tubular piston rod to draw the upper and lower plates against the sealing ring to press it outwardly, two positioning wheels each having a threaded opening engageable with the tubular rod for piston location within the tanks, and a fixed bearing support beneath each wheel rotatably holding the wheels above the tanks, said tubular piston rod having calibrations thereon for moving the piston to locations of predetermined tank volumes, each piston having a vent opening extending through its plates and past the seal, a vent pipe for each tank having its lower end affixed to the lower plate of each piston and connected with the piston vent opening, and its upper end slidably extending through one of the top openings in the tanks, and a breather cap on the upper end of each vent pipe, and a check and air relief valve connected with the vent opening in each piston below the piston.

5. In a machine capable of filling containers with a measured quantity of fluid, two closed measuring tanks each having an inlet and outlet opening in its lower end and a top opening in the upper end, a fluidtight fitting piston slidable in each tank, said piston having two plates with a seal therebetween, an externally threaded tubular piston rod bearing against the upper plate, the upper end of the tank having an opening to receive and pass the piston rod, a smaller diameter rod having one end secured to the lower plate and an upper end extending through the tubular piston rod, a wing nut on the upper end of the smaller rod for abutment with the tubular piston rod to draw the upper and lower plates together and press the seal outwardly, two positioning wheels each having a threaded opening engageable with the tubular piston rod for piston location within the tanks, and a fixed bearing support beneath each wheel rotatably holding the wheels above the tanks, said tubular piston rod having calibrations thereon for moving the piston to locations of predetermined tank volumes, each piston having a vent opening extending through its plates and past the seal, a vent pipe for each tank having its lower end affixed to the lower plate of each piston and connected with the piston vent opening, and its upper end slidably extending through one of the top openings in the tanks, and a breather cap on the upper end of each vent pipe, and a check and air relief valve connected with the vent opening in each piston below the piston, support legs extending from each tank and means to adjust individually the length of each leg.

6. In a machine capable of filling containers with a measured quantity of fluid, a closed measuring tank having an inlet and outlet opening in the lower end and a top opening in the upper end, a piston plate adjustably retained in said tank, a hollow piston rod threaded in said tank, a second piston rod extending through said hollow piston rod, and means on the second piston rod to provide a fluidlight seal, said last named means comprises a plate at the end of the rod and a compressible member between said piston plates whereby vertical adjustment of said second rod causes the compressible member to spread and insure a fluidtight seal.

7. In a machine capable of filling containers with a measured quantity of fluid, a closed measuring tank having an inlet and outlet opening in the lower end and a top opening in the upper end, a piston plate adjustably retained in said tank, a hollow piston rod threaded in said tank, a second piston rod extending through said hollow piston rod, and means on the second piston rod to provide a fluidtight seal, said last named means comprises a plate at the end of the rod and a compressible member between said piston plates whereby vertical adjustment of said second rod causes the compressible member to spread and insure a fluidtight seal, wherein said hollow rod is internally threaded and said second piston rod extends beyond the upper edge of said hollow rod, and tightening means on said upper edge to raise or lower the second piston rod.

8. In a machine capable of filling containers with a measured quantity of fluid, a closed measuring tank having an inlet and outlet opening in the lower end and a top opening in the upper end, a piston plate adjustably retained in said tank, a hollow piston rod threaded in said tank, a second piston rod extending through said hollow piston rod, and means on the second piston rod to provide a fluidtight seal, said last named means comprises a plate at the end of the rod and a compressible member between said piston plates whereby vertical adjustment of said second rod causes the compressible member to spread and insure a fluidtight seal, wherein said hollow rod is internally threaded and said second piston rod extends beyond the upper edge of said hollow rod, and tightening means on said upper edge to raise or lower the second piston rod, said hollow piston includes a positioning wheel.

References Cited in the file of this patent

UNITED STATES PATENTS

| Number | Name | Date |
| --- | --- | --- |
| 262,324 | Severy | Aug. 8, 1882 |
| 1,816,609 | Parker et al. | July 28, 1931 |
| 1,825,039 | Aspden | Sept. 29, 1931 |
| 1,951,503 | Creveling | Mar. 20, 1934 |
| 2,062,181 | Klaus | Nov. 24, 1936 |